US012184780B1

(12) United States Patent
Hendry et al.

(10) Patent No.: US 12,184,780 B1
(45) Date of Patent: *Dec. 31, 2024

(54) SECURE DATA COMMUNICATION USING ELLIPTIC-CURVE DIFFIE-HELLMAN (ECDHE) KEY AGREEMENT

(71) Applicant: United Services Automobile Association (USAA), San Antonio, TX (US)

(72) Inventors: Jason Paul Hendry, Selma, TX (US); Zachary Curtis Wade, Frisco, TX (US); Daniel Thane Davidson, Rexburg, ID (US); Patrick Joseph O'Neal, San Antonio, TX (US); Justin Armstrong Leonard, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,533

(22) Filed: Jan. 3, 2023

Related U.S. Application Data (63) Continuation of application No. 16/885,053, filed on May 27, 2020, now Pat. No. 11,546,156.

(51) Int. Cl.
*H04L 9/30* (2006.01)
*H04L 9/08* (2006.01)

(52) U.S. Cl.
CPC ............ *H04L 9/3066* (2013.01); *H04L 9/085* (2013.01); *H04L 9/0861* (2013.01); *H04L 9/0894* (2013.01)

(58) Field of Classification Search
CPC ..... H04L 9/3066; H04L 9/085; H04L 9/0861; H04L 9/0894
USPC ......................................................... 380/30
See application file for complete search history.

(56) References Cited

U.S. PATENT DOCUMENTS

| | | | |
|---|---|---|---|
| 9,003,181 B2 | 4/2015 | Little | |
| 10,515,403 B1* | 12/2019 | Allen | ............... G06Q 30/08 |
| 2011/0145585 A1 | 6/2011 | Campagna | |
| 2016/0218875 A1 | 7/2016 | Le Saint | |
| 2019/0243980 A1* | 8/2019 | Inamdar | ............... H04L 63/0428 |
| 2021/0218560 A1* | 7/2021 | Nix | ............... H04L 9/3252 |
| 2022/0166609 A1* | 5/2022 | Igarashi | ............... H04L 9/3239 |

* cited by examiner

*Primary Examiner* — Kambiz Zand
*Assistant Examiner* — Phuc Pham
(74) *Attorney, Agent, or Firm* — Perkins Coie LLP (57) ABSTRACT

The present embodiments relate to establishing secure data communication using an Elliptic-curve Diffie-Hellman ephemeral (ECDHE) key agreement procedure. Devices in a network environment can utilize a key agreement procedure to establish secure communication between multiple application layers in a micro service architecture. Particularly, a tunnel can be established between a mobile device and an encryption service by transmitting key information between the mobile device and the encryption service. This can allow for encryption keys to only be accurately generated by the mobile device and encryption service. Accordingly, intermediary nodes may be unable to decrypt the data, allowing for safe and secure transport of sensitive data.

20 Claims, 9 Drawing Sheets

SECURE DATA COMMUNICATION USING ELLIPTIC-CURVE DIFFIE-HELLMAN (ECDHE) KEY AGREEMENT

CROSS-REFERENCE TO RELATED APPLICATION

This application is a continuation of U.S. patent application Ser. No. 16/885,053, filed on May 27, 2020, which is hereby incorporated by reference in its entirety.

BACKGROUND

This disclosure is directed generally to cyber security, and more particularly, to establishing secure data communication by implementing a key agreement procedure.

Applications executing on various network-accessible devices are used to perform tasks. Performance of such tasks can include the device communicating data to external nodes via a communication interface (e.g., the Internet). For example, to retrieve information to be displayed on an application on a mobile device, a request for specific data that is sensitive in nature (e.g., card number data, client information) can be sent to an external node to retrieve the relevant information. Such a process can include forwarding sensitive information across multiple devices in a networked environment. However, this may leave the sensitive data vulnerable to risk of unauthorized access to the data. For example, private payment data relating to a client can be exposed if an intermediary device obtains the private payment data.

In many cases, an architecture may be established in an attempt to secure the communication. For example, data can be sent using shared keys to encrypt/unencrypt data sent over a network. However, such a process may expose this data to risk of unauthorized access due to dependency to legacy enclave services and the shared keys. Further, intermediary devices can unencrypt encrypted information (which may be referred to as a "man-in-the-middle attack"), leaving the data at risk of unauthorized access.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Network-accessible devices (e.g., a mobile device) can interact with external computing devices to process sensitive data. For example, a mobile device can send a request to retrieve sensitive client data or to process a purchase for a client to an external node. In this example, sensitive data (e.g., a card number, client personal information) can be retrieved from external nodes and communicated across a network to perform the requested tasks. Such a process can include forwarding sensitive information across multiple devices in a networked environment. However, this may leave the sensitive data vulnerable to risk of unauthorized access to the data. For example, private payment data relating to a client can be exposed if an intermediary device obtains the private payment data.

Further, in many instances, communication of data across various networks may not be in accordance with various standards (e.g., payment card industry data security standard (PCI)). In such instances, data may have insufficient encryption detail for data to be transmitted in certain network environments. For example, transmitting a card number between an enclave backend node through a firewall to a mobile device may require transmitting through an application programming interface (API) that is not considered secure. This may leave data at risk of unauthorized access.

System Overview

The present embodiments relate to establishing secure data communication using an Elliptic-curve Diffie-Hellman ephemeral (ECDHE) key agreement procedure. Devices in a network environment can use a key agreement procedure to produce a secure data flow (or tunnel) between multiple application layers in a micro service architecture. Particularly, a tunnel can be established between a device (e.g., mobile device) and an encryption service by transmitting key information between the mobile device and the encryption service. This can allow for encryption keys to only be accurately generated by the mobile device and encryption service. Accordingly, intermediary nodes are unable to decrypt the data, allowing for safe and secure transport of sensitive data. The key agreement procedure as described herein can encrypt the data on an application level rather than a network level, thereby allowing encryption of sensitive data by field using ephemeral keys. As noted, the data can be encrypted on a field-by-field basis. For example, in a transaction, several pieces of information are sent but not all are sensitive. That is, only some of data in a transaction request (e.g., card number) needs to be encrypted using ephemeral keys.

Further, the technology described herein can provide complete end to end attribute encryption solution. This can provide security and protection for a man in the middle attack, support a multi-tiered architecture, and mitigate any need to perform a device-side encryption. The present embodiments as described herein can utilize ephemeral keys that can allow for encryption of both ends of a tunnel and pass the data across the tunnel without allowing the man in the middle to decrypt that information.

The present embodiments can utilize an ECDHE Key Agreement procedure to establish attribute level encryption for multiple consumer platforms. Advantageously, this technology can be securely deployed to all client-side devices in part because a single key cannot be reused and because each client device uses their own ephemeral encryption key. Embodiments described herein provide a private tunnel between two trusted application layers.

The mobile device and enclave backend device can share public/private keys to generate shared secret key data. The devices can use shared secret data to generate a symmetric encryption key session. This can be done by using a web service that helps the clients negotiate keys and a combination of key management and API integrations. These techniques can implement a cryptographic solution on a field by field basis, thus securing and encrypting data that needs to be secured/encrypted.

As an illustrative example, data including a card number and other data can be transmitted in the context of a transaction. The data can be transmitted from a device such as a mobile device and sent to an application at a server to be processed. In this example, the encryption for the full card number can use the ECDHE key agreement whereas other data can be encrypted differently or not encrypted at all. Using the ECDHE key agreement ensures the generation of the encryption keys can only realistically be obtained on the enclave server and the mobile device. For instance, in the elliptic-curve (EC) protocol, both mobile device and back end API can use a P256 Curve when generating ephemeral keys.

In some embodiments, a method to establish secure communication via a key agreement procedure is disclosed. The method can include receiving, by an encryption node, a request for an identified set of data from a first device. The request can include a first elliptic curve (EC) certificate associated with the first device. The first EC certificate can include a first device public key derived from an ephemeral EC key pair that includes information that is common to the first device and the encryption node.

The first device public key can include a combination of the information common to the first device and the encryption node from the ephemeral EC key pair and a set of information specific to the first device. The first device can be configured to combine both the set of information specific to the first device and the information specific to the first device to derive the second encryption key that corresponds to the first encryption key. The request can include a first field that does not include sensitive information and a second field that includes sensitive information. In some implementations, the identified set of data can include only the second field.

In some embodiments, the system can transmit the response message to a first application programming interface (API) configured to forward the response message to the first device. The first API may not include information relating to the ephemeral EC key pair and thus may be unable to unencrypt the identified set of data that is encrypted in the response message.

In response to receiving the request for the identified set of data, an encryption node can obtain the identified set of data from a backend node. The encryption node can further retrieve the ephemeral EC key pair that includes the information common to the first device and the encryption node.

The encryption node can generate a first encryption key based on the ephemeral EC key pair and the first EC certificate. This can include combining information included in the first device public key and a set of information specific to the encryption node to derive a first set of shared secret data, the first set of shared secret data included in the first encryption key.

The encryption node can encrypt the identified set of data using the first encryption key and can transmit a response message to the first device. The response message can include the identified set of data that is encrypted and a second EC certificate associated with the encryption node that includes an encryption service public key derived from the ephemeral EC key pair.

The encryption service public key can be generated by combining portions of the information common to the first device and the encryption node from the ephemeral EC key pair and the set of information specific to the encryption node. The system can generate a second EC certificate including the encryption service public key.

The first device can generate a second encryption key that corresponds to the first encryption key using the second EC certificate and the ephemeral EC key pair. The first device can also unencrypt the identified set of data using the second encryption key.

Figure 1:
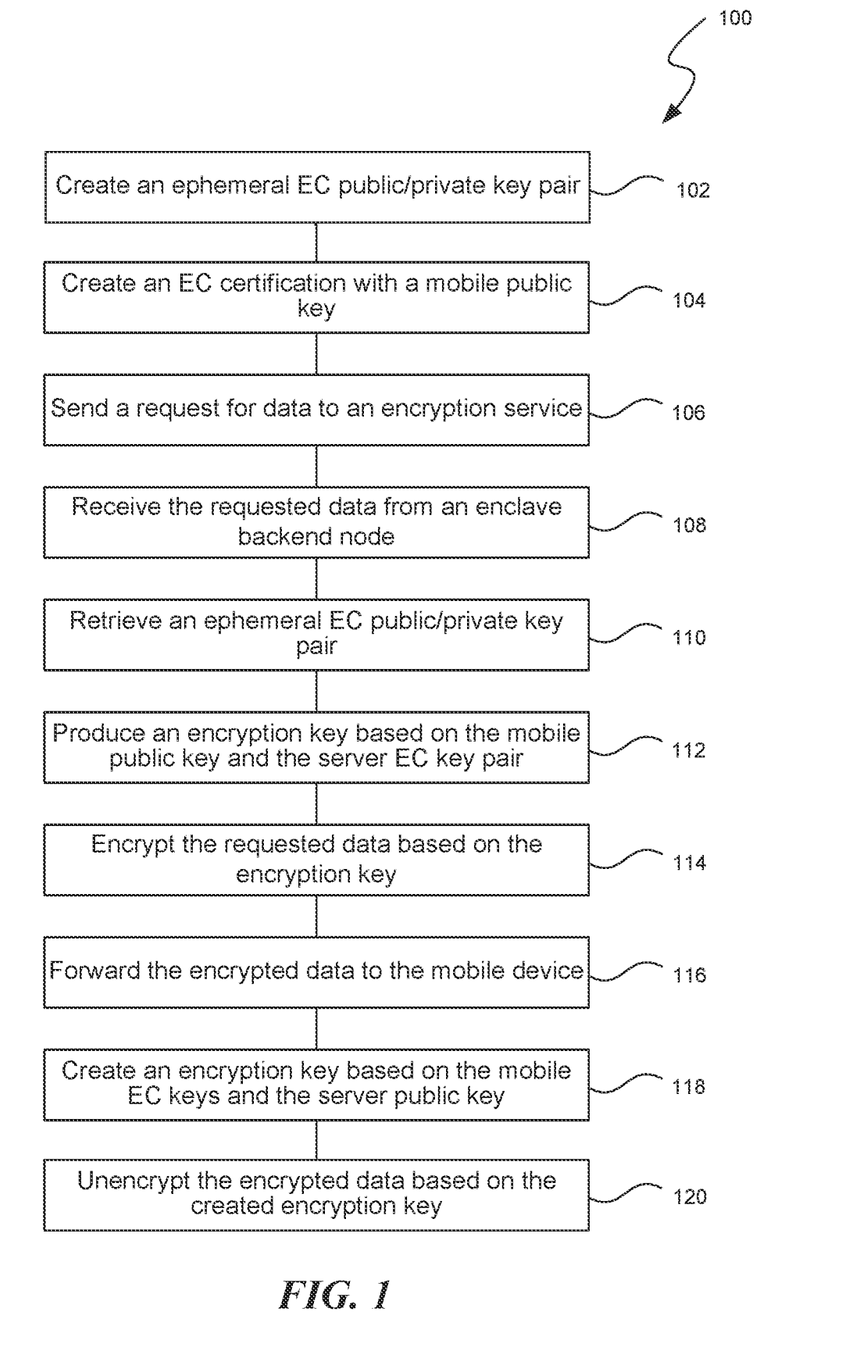
FIG. 1 is a flow process of an example method for secure data communication using a key agreement procedure.

FIG. 1 is a flow process of an example method 100 for secure data communication between a device (e.g., a mobile device) and a backend server using a key agreement procedure. As shown in FIG. 1, the method can include creating an ephemeral EC public/private key pair (block 102). This key pair can include information common to both the mobile device and the encryption service. The key pair can be used in creating an encryption key that can only be decrypted by the mobile device and encryption service. For instance, a private key for each mobile device and encryption service can include data specific to the mobile device and the encryption service, while the public keys can include information that is common between the mobile device and encryption service. The key pair can be created and/or obtained by the mobile device (e.g., an application on the mobile device). In some instances, the key pair can be obtained by a cryptography entity.

The method can include creating an EC certificate with a mobile public key (block 104). The EC certificate with the mobile public key can be indicative of data that is associated with the mobile device. The EC certificate can include information authenticating the identity of the device generating the certificate, thereby allowing for receiving devices to "trust" the certificate and public key. The EC certificate and the mobile public key can be used to create an encryption key by the encryption service. Accordingly, the mobile device can utilize data specific to the mobile device to create the encryption key to unencrypt data encrypted by the encryption service.

As noted above, a mobile public key can include mobile public data as described herein. The mobile public data can include a combination of agreed common data and mobile-device specific data.

The method can include sending a request for data to an encryption service (block 106). This request can include the mobile EC certificate that contains the mobile public key. The request can identify a portion of data to be encrypted by the encryption service. For instance, the request can be a field-by-field request, wherein one or more fields that include sensitive data (e.g., a card number) can be requested to be encrypted as described herein.

In some instances, the method can include sending data between the mobile device and the encryption service via one or more intermediary nodes. For example, a request for data can be forwarded from the mobile device to an API (e.g., an experience API), and the API can forward the data to the encryption service. However, such an intermediary node may be unable to decrypt information obtained from the mobile device or encryption service, as the intermediary node may not have the information necessary to decrypt the data.

The method can include receiving the requested data from an enclave backend node (block 108). The requested data can be unmasked and can include sensitive information (e.g., a card number).

The method can include retrieving an ephemeral EC public/private key pair (block 110). The ephemeral EC public/private key pair can correspond to or be associated with the ephemeral EC public/private key pair created by the mobile device. This can provide common information between the mobile device and the encryption service that allows for generation of an encryption key to encrypt/unencrypt data.

The method can include producing an encryption key based on the mobile public key and the server EC key pair (block 112). The encryption key can include a combination of the agreed common information (e.g., ephemeral EC public/private key pair information) and the mobile public data.

The method can include encrypting the requested data based on the encryption key (block 114). The encrypted data can be encrypted such that only the mobile device is capable of unencrypting the data, as the mobile device includes information that allows for generation of the encryption key.

The method can include forwarding the encrypted data to the mobile device (block 116). This message can include a server EC certificate that contains the server public key. The server public key can include a combination of agreed common data and the server EC certificate (e.g., enclave-specific data).

The method can include the mobile device creating an encryption key based on the mobile EC keys and the server public key (block 118). The mobile device can create the encryption key using the mobile EC keys (e.g., mobile device-specific data) and the server public key.

The method can include the mobile device unencrypting the encrypted data based on the created encryption key (block 120). The mobile device can utilize the encryption key to unencrypt the data. The mobile device (e.g., via an application executing on the mobile device) can present the unencrypted data to a client.

Example System Context Overview

Figure 2:
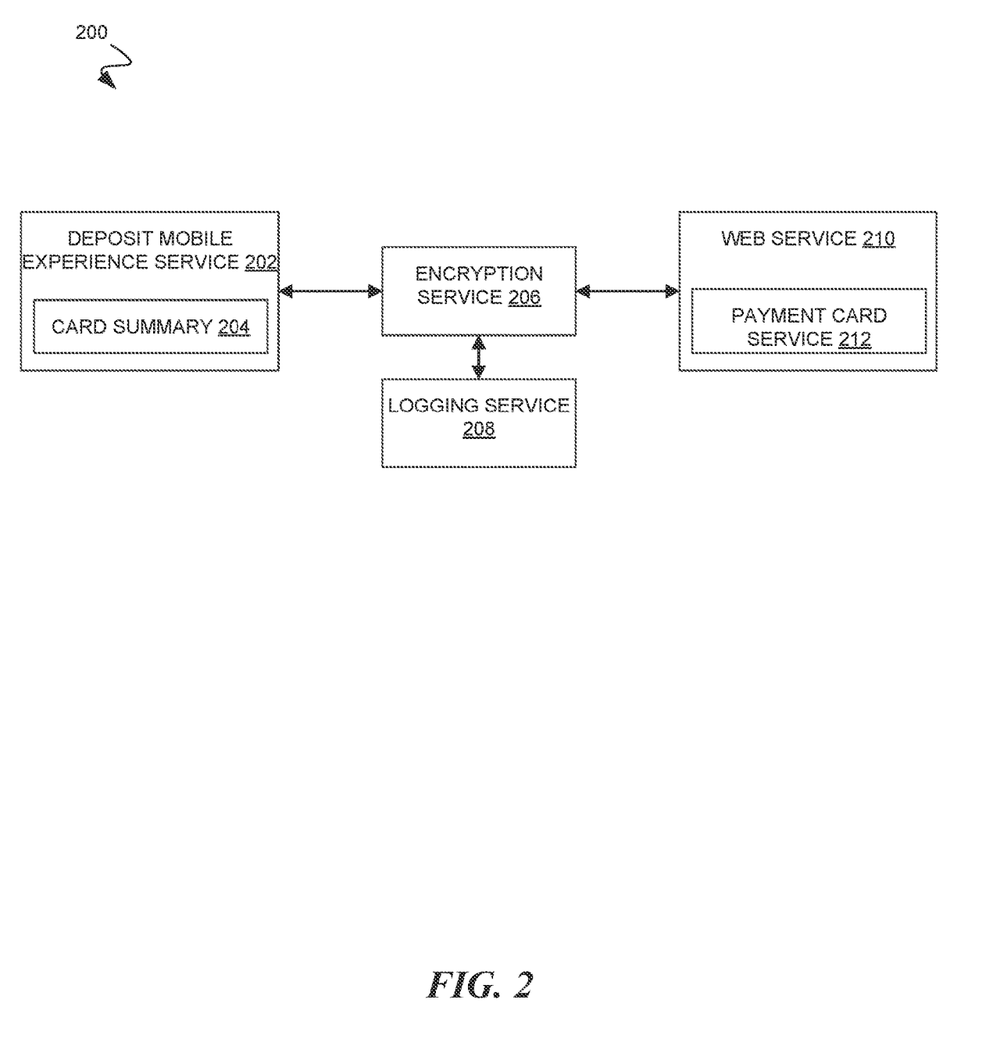
FIG. 2 is a block diagram of an example system architecture in which the present embodiments can be implemented.

FIG. 2 is a block diagram of an example system architecture 200 in which the present embodiments can be implemented. The system architecture 200 as described herein can include a series of applications/nodes/devices that can allow for secure data communication over a network.

The system architecture 200 can include a deposit mobile experience service 202. The deposit mobile experience service 202 can include an application configured to execute on a device (e.g., a mobile device). The deposit mobile experience service 202 can include various client information, such as a card summary 204, for example. The deposit mobile experience service 202 can generate a request for data (e.g., an encrypted card number for a card token) to be sent to an encryption service 206.

The system architecture 200 can include an encryption service 206. The encryption service 206 can act as a tunnel end point with the deposit mobile experience service 202 (e.g., or mobile device). The encryption service 206 can handle data from the mobile device and the web service 210 to securely pass sensitive data from the web service 210 to the deposit mobile experience service 202.

The encryption service 206 can execute a card encryption service that can access backend services (e.g., web service) in order to get data encrypted and transmitted. The card encryption service can be implemented by a computing node. In some cases, the computing node can reside with a secured embodiment that also includes secure nodes (e.g., web service 210). The encryption service 206 can securely retrieve unmasked data from the web service 210, encrypt the data, and send the encrypted data to the deposit mobile experience service 202. The encryption service 206 can implement an encryption scheme to transmit data securely down to the mobile device.

The encryption service 206 can interact with a logging service 208. The logging service 208 can include an application capable of logging events and/or errors from the encryption service. As an example, the logging service can utilize elasticsearch fluentd kibana (EFK) to implement logging of events and/or errors.

The system architecture 200 can include a web service 210. The encryption service 206 can request card details for a card token. The web service 210 can include a payment card service 212 capable of maintaining requested data (e.g., card number). The web service 210 can include an enclave application that can support the handling of sensitive data. This can include a system or record for obtaining sensitive data in an encrypted form. The web service 210 may be isolated, while the encryption service 206 and the deposit mobile experience service 202 can be publicly accessible.

Though embodiments described herein generally discuss sensitive information being sent from a server to a mobile device using the key agreement, sensitive data can be sent from the mobile device to the server using the same process.

Key Generation Overview

Figure 3:
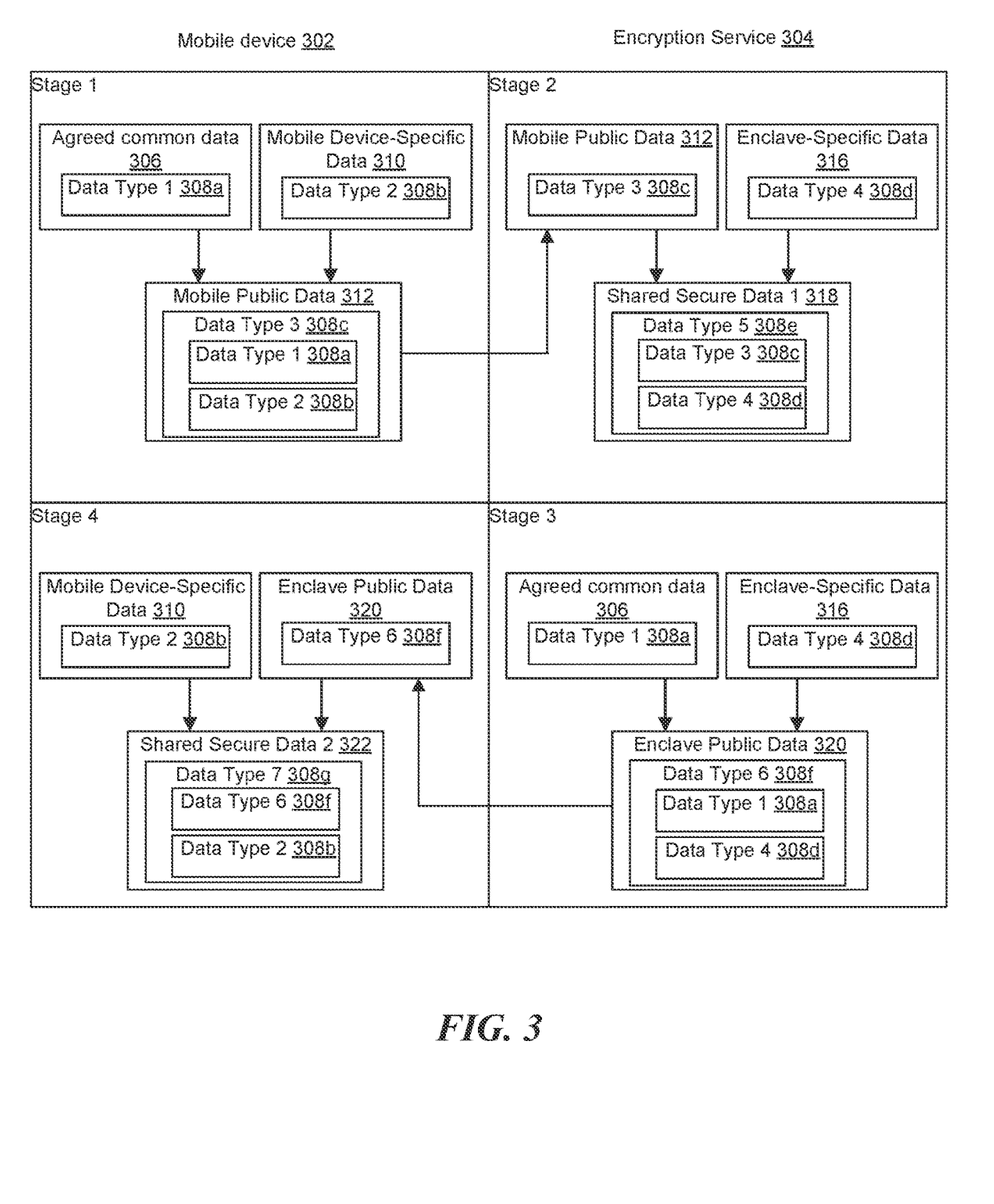
FIG. 3 is an example block diagram illustrating a process for generation of secure keys to encrypt and unencrypt data.

FIG. 3 is an example block diagram illustrating a process 300 for generation of secure keys to encrypt and unencrypt data. This can be divided into multiple stages performed by any of a mobile device 302 and an encryption service 304 (e.g., an enclave backend node or enclave API).

At a first stage, the mobile device 302 can obtain both agreed common data 306 and mobile device specific data 310. The agreed common data 306 can include information that is common to or corresponding between the mobile device 302 and encryption service 304. The agreed common data 306 can include data of a first type 308a. The mobile device-specific data 310 can include data unique to the mobile device and only known by the mobile device. The mobile device-specific data 310 can include data of a second type 308b.

The agreed common data 306 and mobile device specific data 310 can both be utilized in generation of mobile public data (e.g., or a mobile public key). The mobile public data 312 can include data of a third type 308c that includes a first data type 1 308a and a second data type 308b. The mobile public data 312 can be forwarded to the encryption service 304. In some instances, the mobile public data 312 can be provided with a request for encrypted data.

At a second stage, the encryption service 304 (e.g., enclave backend node) can process the mobile public data 312 and enclave specific data 316 to derive shared secure data 318. The enclave-specific data 316 can include information that is unique to the encryption service 304 that includes a fourth data type 308d. The encryption service 304 can combine the mobile public data 312 and the enclave-specific data 316 to generate the shared secure data 318 that includes a fifth data type 308e. The shared secure data 318 can include shared secret information between the encryption service 304 and mobile device 302 that can be used to encrypt the data. The encryption service 304 can be used to encrypt the sensitive data (e.g., an unmasked card number).

At a third stage, the encryption service 304 can generate enclave public data 320 by combining the agreed common data 306 and enclave-specific data 316. The enclave public data 320 can be provided to the mobile device 302 for the mobile device to generate an encryption key and unencrypt any encrypted data. The agreed common data 306 of a first data type 308 a and the enclave-specific data 316 of the fourth data type 308d can be combined to create the enclave public data that includes a sixth data type 308f. The enclave public data 320 can be sent to the mobile device 302. In some instances, the enclave public data 320 can be sent with requested data that is encrypted.

At a fourth stage, the mobile device 302 can generate an encryption key and unencrypt encrypted data based on mobile-device specific data and enclave public data (e.g., an enclave public key). The mobile device can combine the mobile device-specific data 310 and the enclave public data 320 to generate shared secured data 2 322. The shared secured data 2 322 can be used to generate an encryption key and can include a seventh data type 308g that includes a data type of the mobile device-specific data 310 (e.g., data type 2 308b) and the enclave public data 320 (e.g., data type 6 308f).

Accordingly, the four stages as described herein can be illustrative of an example for creating a tunnel between the mobile device and encryption service. Particularly, a mobile public key can be created from mobile public data and send to encryption service to generate shared secure data to encrypt data. The encrypted data can be sent to the mobile device along with the enclave public data (e.g., enclave public key). The enclave public key can be used by the mobile device to generate the encryption key and to unencrypt the data.

Example Embodiment 1

Figure 4:
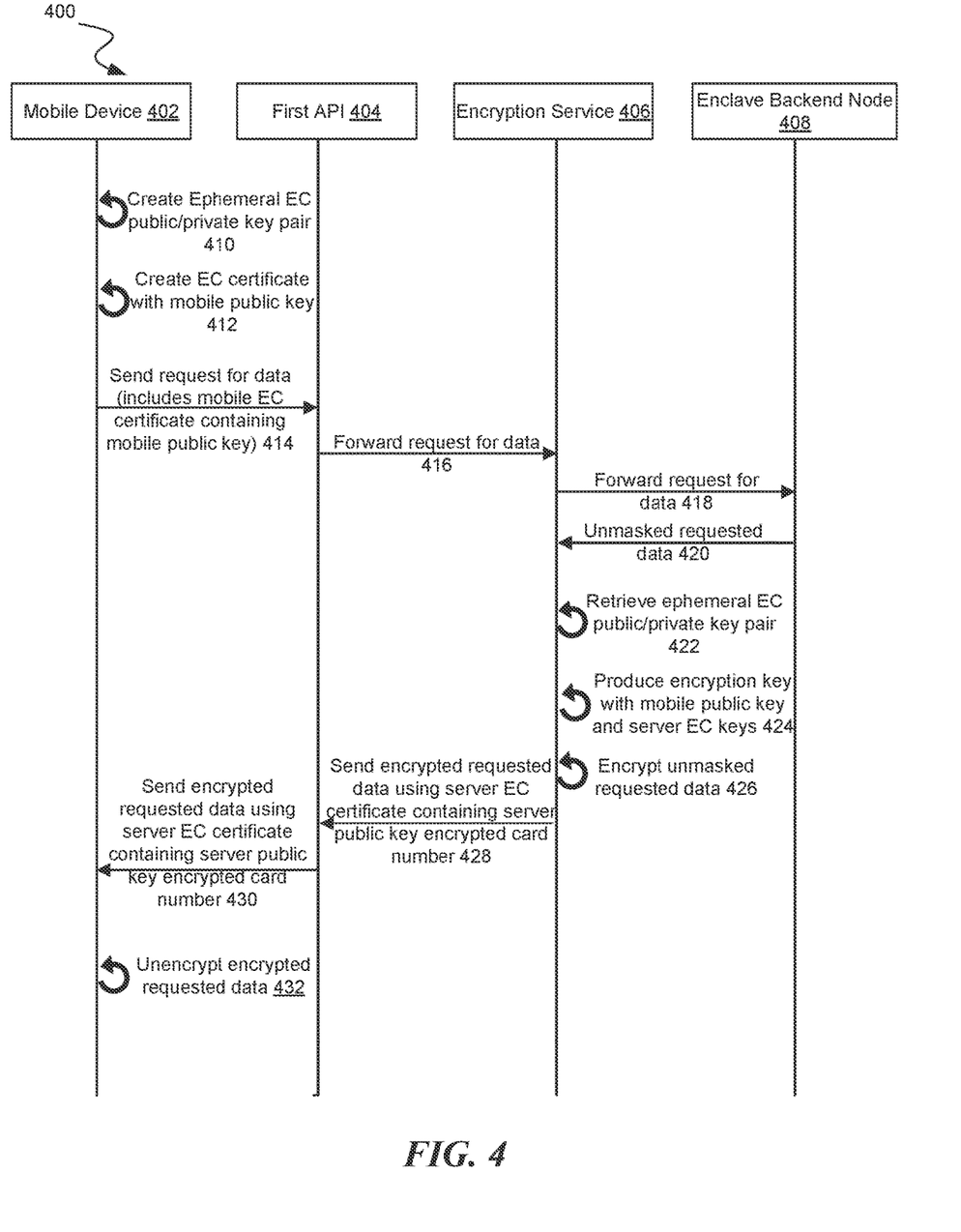
FIG. 4 illustrates an example signaling process for securely communicating data using an ECDHE agreement procedure, according to a first example embodiment.

A first example embodiment can relate to establishment of secure communication by producing ephemeral EC keys for a client on a session basis. FIG. 4 illustrates an example signaling process 400 for securely communicating data using an ECDHE agreement procedure, according to a first example embodiment. As shown in FIG. 4, the data can be communicated between a mobile device 402, a first API 404 (e.g., an experience API), an encryption service (e.g., enclave API) 406, and an enclave backend node (e.g., a payment card API) 408.

The mobile device 402 and enclave API 406 can establish a secure tunnel using an ECDHE agreement procedure. The enclave API 406 can implement encryption processes and/or record data. In some instances, in an object with various fields with at least one field including sensitive data, the mobile device 402 can request and receive only fields that include sensitive data.

The mobile device 402 and enclave API 406 can communicate via one or more intermediary nodes (e.g., first API 404). As noted above, the mobile device and enclave API can securely transmit data utilizing information known by only the mobile device and/or enclave API. In other words, a device, such as the first API may be unable to decrypt encrypted data between the mobile device and the enclave API. The first API can include an experience API that includes any number of applications in the middle that can aggregate all the other data needed for this experience. The data may be brought down to the mobile device while having some of those fields be encrypted and kind of requested from some secured environment and then from that secured environment safely going back down to the mobile device.

The signaling process can identify a multi-layered architecture that can utilize micro services. Accordingly, the environment can include a collection of micro services that perform one function that can then be aggregated at an experience level as part of an intra-architecture. This can allow for retrieving data from all different types of sources and one of those sources can be the enclave API (e.g., encrypted card service), where it can return that encrypted while not being visible to any of the layers in between.

In operation 410, the mobile device 402 can create an ephemeral EC public/private key pair. The EC public/private key pair can include information common (e.g., agreed common data 306 as discussed with respect to FIG. 3) to both the mobile device 402 and encryption service 406.

In operation 412, the mobile device 402 can create an EC certificate with a mobile public key. The mobile public key can include a combination of the ephemeral EC public/private key pair data and mobile device specific data. The EC certificate can be used to back the public key that was produced to generate the tunnel with the enclave API 406.

In operation 414, the mobile device can send a request for data to the experience API 404. The request can include the mobile EC certificate that contains the mobile public key. In this request, a part of the data may need to be securely encrypted. Accordingly, the mobile device 402 can pass the EC certificate and the public keys to the enclave API 406 for the enclave API to safely encrypt requested data. In operation 416, the Experience API 404 can forward the message to the enclave API 406. The experience API may include one or more sub-systems.

In operation 418, the encryption service 406 can send a request for the requested data to an enclave backend node 408. In operation 420, the encryption service 406 can receive the unmasked (or unencrypted) requested data from the enclave backend node 408 (e.g., a payment API). This request can be for a field that is to be retrieved in a secure manner and send to the mobile device. The enclave backend node 408 can include an API that can make a call to the enclave backend node to determine whether the node has the requested data. For example, the enclave backend node 408 can include a payment card system that retrieves an unmasked card number.

In operation 422, the encryption service 406 can retrieve ephemeral an EC public/private key pair. The EC public/private key pair can be retrieved from a set of cryptographer information. At least a portion of the information can be common to both the mobile device and the encryption service.

In operation 424, the encryption service 406 can produce an encryption key with a mobile public key and server EC keys. The enclave public key can include enclave public data that includes both agreed common data and enclave-specific data of various data types.

In operation 426, the encryption service 406 can encrypt the requested data. This can be encrypted using the enclave public key. In operation 428, the encryption service 406 can send the requested data that is encrypted to the first API. This message can include a server EC certificate containing the server public key. The enclave API can produce an EC key pair and a shared secret data or an encryption key to encrypt the sensitive data from the public key from the mobile device and the shared secret data and a private key. The field can be sent to the mobile device fully encrypted and including a server or enclave API public key that the mobile device can produce the same encryption key.

If the first API obtains the sensitive data that is encrypted, it only would have two public keys produced by the mobile device in the enclave API. Accordingly, the first API would not have the necessary information to build the encryption key to decrypt the data. The first API can be used to securely pass data between the mobile device and the encryption service.

In operation 430, the first API can forward the encrypted requested data to the mobile device 402. The mobile device can obtain both the public key for the enclave API and the encrypted sensitive data.

In operation 432, the mobile device 402 can decrypt the requested information using the mobile EC keys with server public key and a created encryption key. The mobile device can use its shared secret with its private key to then produce the same encryption key that it can then use to unencrypt the cypher text to then get the sensitive data. The sensitive data can be presented to a client on the mobile device.

Accordingly, in the present embodiments, data can be securely communicated between mobile device and encryption service via any number of additional nodes (e.g., first API), as the other nodes would not have the information necessary to decrypt the secure communications. The present embodiments may prevent unauthorized access by an intermediary device (e.g., a man in the middle attack), as the data may be unable to be decrypted by any intermediary nodes.

Figure 5:
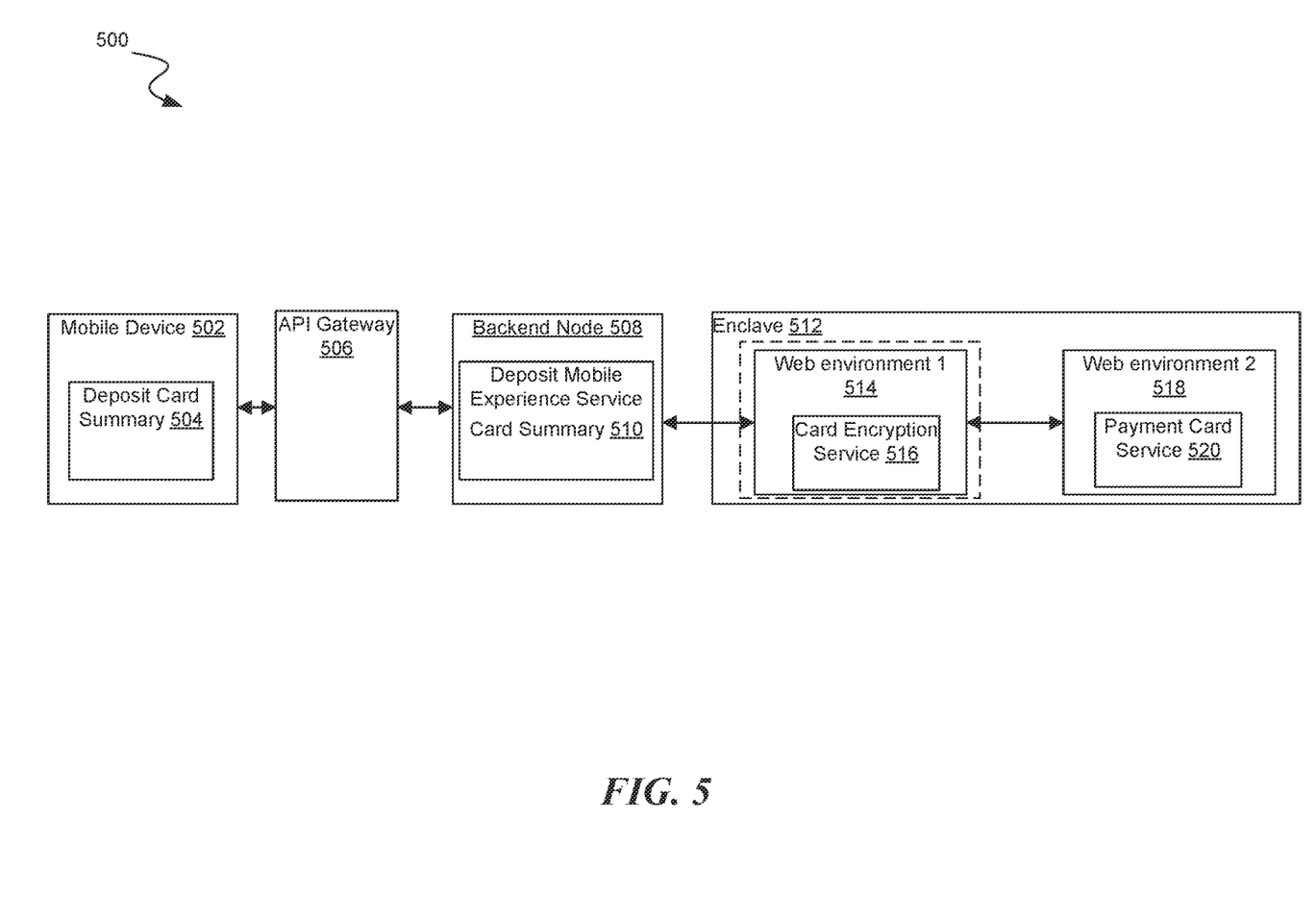
FIG. 5 is a block diagram of an example system architecture, in accordance with a first example embodiment.

FIG. 5 is a block diagram of an example system architecture 500, in accordance with a first example embodiment. As shown in FIG. 5, the environment 500 can include a mobile device 502. The mobile device 502 can include a deposit card summary, for example. The mobile device can identify a request for information, such as, for example, a request to see all the transactions or see the balance or for this case go to the card management screen and then on the card management screen, see their unmasked card number. In this example, the request can go through an API (e.g., an experience API) built to assist in providing the experience for the mobile device. The mobile device can include any network-accessible electronic device, such as a smartphone, tablet, computer, wearable device, etc.

The API gateway 506 can be designed to support the user experience for the deposit card summary for the mobile device. Accordingly, a request from the mobile device 502 can go through the API gateway 506. This API gateway can include a restful API that can assist in implementing encryption processes as described herein.

The request can be forwarded from API gateway 506 to a backend node 508. The backend node 508 can include a deposit mobile experience service and a card summary 510, for example. The backend node 508 can send the request to a first web environment 514 that includes a card encryption service 516. The encryption service 516 can send a request for the unmasked card number from payment card service 520 included in web environment 2 518 within the enclave 512.

Accordingly, a request for a card number can be sent from mobile device 502 to API gateway 506 that can be forwarded to backend node 508. The experience service 510 can then make a request to a new API existing in the enclave 512 to call for the unmasked card service and implementing encryption as described herein.

Example Embodiment 2

A second example embodiment may relate to the mobile device using a public-key cryptosystem (e.g., Rivest-Shamir-Adelman (RSA)) key generation to produce an encryption key. The key can pass to an enclave server to encrypt the requested data (e.g., a card number). This can include the mobile device generating a new Advanced Encryption Standard (AES) encryption key for a new session or on install of the mobile device. This encryption key can be passed through to the enclave API to encrypt unmasked data. The enclave service can return the cyphertext to the mobile device where it uses the same generated AES key to unencrypt the data to display to the member.

Figure 6:
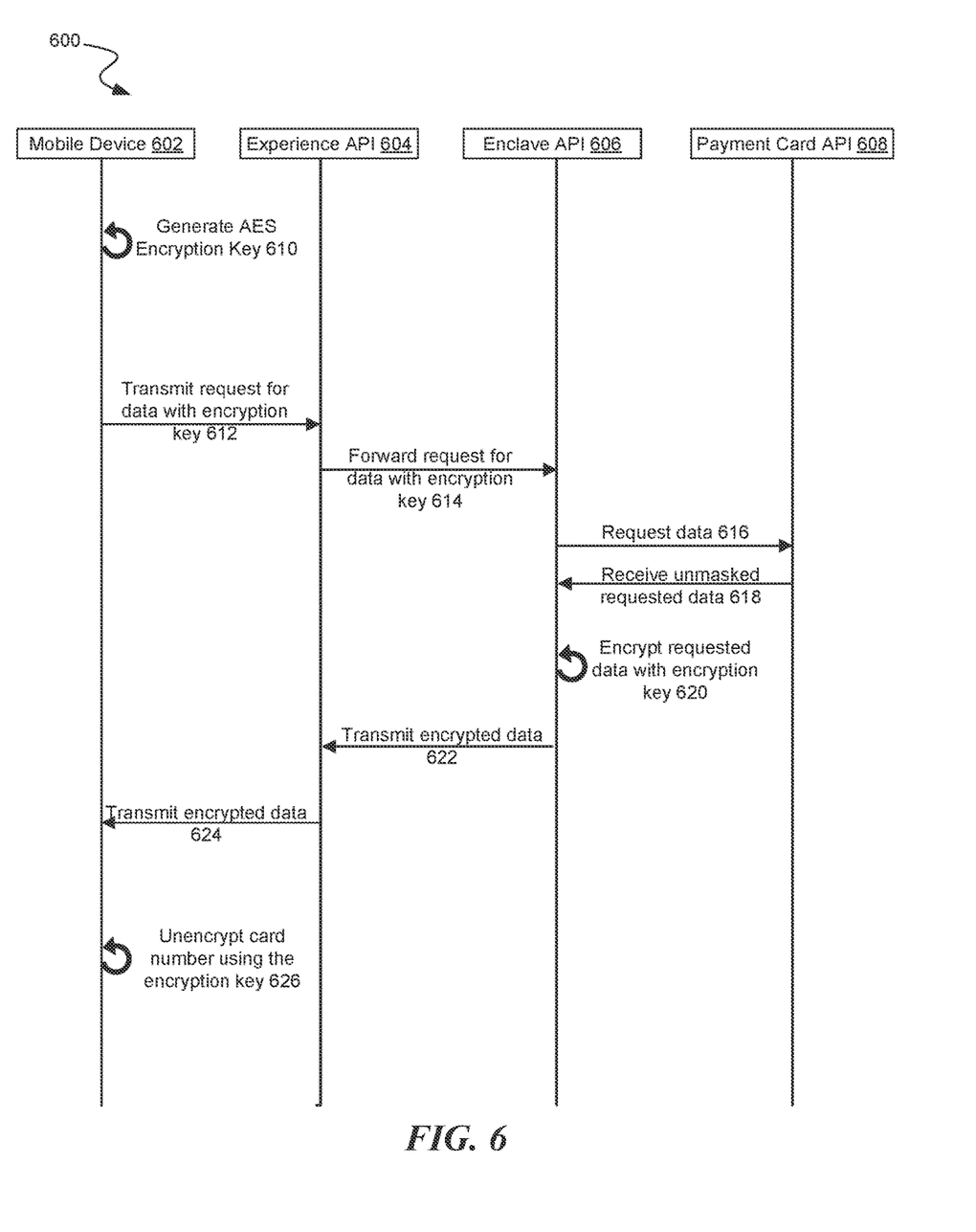
FIG. 6 is an example signaling process for implementing secure data communication, in accordance with a second example embodiment.

FIG. 6 is an example signaling process 600 for implementing secure data communication, in accordance with a second example embodiment. In operation 610, a mobile device 602 can generate an AES encryption key. The AES encryption key can be used to encrypt secure data transmitted between the mobile device 602 and the enclave API 606.

In operation 612, the mobile device 602 can send a request for data (e.g., a card number) ad an encryption key to experience API 604. In operation 614, the Experience API 604 can forward the request to the enclave API 606.

In operation 616, the enclave API 406 can request the data (e.g., an unmasked card number) from a payment card API 608. In operation 618, the enclave API 606 can receive the requested data from the payment card API 608.

In operation 620, the enclave API 606 can encrypt the data (e.g., unmasked card number) with the retrieved encryption key. In operation 622, the enclave API 606 can forward the encrypted data to the experience API 604. In operation 624, the experience API 604 can forward the encrypted data to the mobile device 602. In operation 626, the mobile device 602 can unencrypt the data using the generated AES key.

The enclave API can have adaptability features that includes a design for the API to be a micro service designed to handle the single capability of encrypting of secure data (e.g., Payment Card Industry Data Security Standard (PCI) card data) for transit to a mobile device. The adaptability features can support an ability to change requirements and migrate functionality if needed.

The enclave API can have auditability features that allow for a history of changes and approvals to be maintained. The application can be deployed onto an enclave backend node to ensure the data is secure when handling secure data. The enclave API can have availability features to enable dashboards and alerts to generate notifications about the health and availability of the API.

The enclave API can have deploy-ability features that allow for changes to the test and production environments to be made. The enclave API may also have extensibility features that, with the microservice nature of the application, the API's scope can be minimized to only solve the problem of encrypting data. If the capability of the API needs to be expanded upon, then the API capability can expand without impact to other features as there may be no other parts of the system directly implemented with this API.

The enclave API can include performance features that allow for efficient identification performance issues, such as by inspecting performance in implementing encryption of an unmasked card number.

The enclave API security can include an application secured within an enclave environment. The application can implement OAuth security along with AES256 encryption, for example, for encrypting an unmasked card number. Using ECDHE, the key agreement used can provide forward secrecy with the encryption keys to encrypt the data. This can also allow for establishment of tunnel between the enclave and the mobile device, allowing for safe transfer of sensitive data between the protected device (e.g., mobile device) and the enclave server.

In some embodiments, the ECDHE key exchange can support the encryption of the full card number. Further, ECDHE can allow for a key exchange where only the mobile device and the enclave server are able to produce the encryption key. A client Mobile EC key pair can be generated by either the mobile device or by an infrastructure backed key store.

In some instances, a new security API may need to be built to support server-side generation of key pairs. The mobile device can include a system where the keys are generated and stored allowing a tactical solution for implementing the key exchange.

Example Embodiment 3

A third example embodiment may relate to mobile device EC keys being produced and maintained by a KeyStore API. The API can provide the same EC key pair to both the mobile device and the enclave API to encrypt and unencrypt data (e.g., an unmasked card number).

The environment can include a KeyStore API that can build/contain cached/persisted EC key pairs for a client. This can ensure that a set of keys are provided for longer than a single session and can support an ability to persist the key pairs without persisting them on a mobile device. This can allow for the mobile device and enclave server (via enclave API) to be the only applications that need to handle the EC keys.

Figure 7:
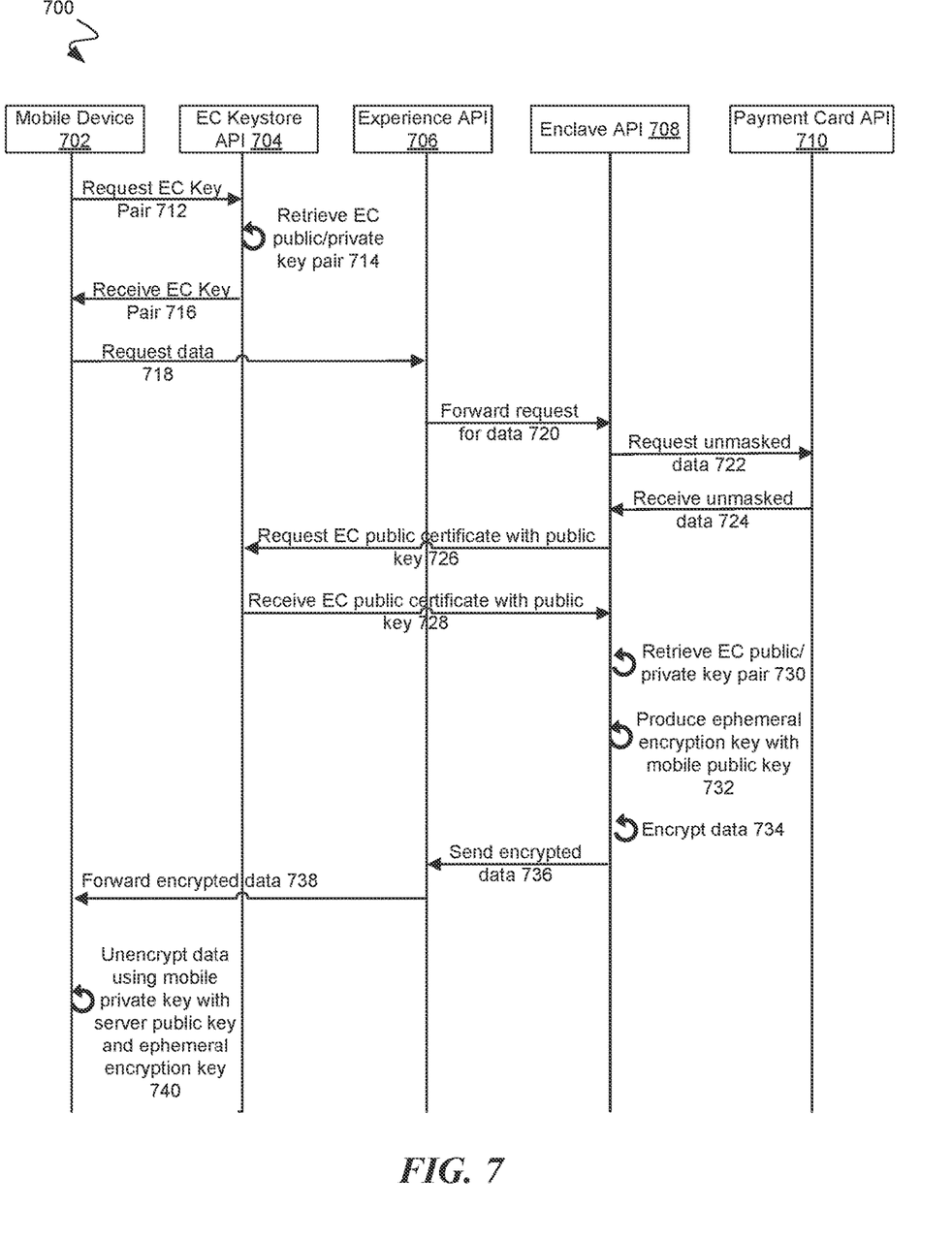
FIG. 7 is an example signaling process for implementing secure data communication, in accordance with a third example embodiment.

FIG. 7 is an example signaling process 700 for implementing secure data communication, in accordance with a third example embodiment. In operation 712, the mobile device 702 can request an EC key pair from the EC KeyStore API 704. In operation 714, the EC KeyStore API 704 can retrieve an EC public/private key pair. In operation 716, the EC KeyStore API 704 can send the EC key pair to the mobile device 702.

In operation 718, the mobile device 702 can send a request for data (e.g., a card number) to the experience API 706. In operation 720, the experience API 706 can forward the request to the enclave API 708. In operation 722, the enclave API 708 can request unmasked data from a payment card API 710. In operation 724, the enclave API 708 can receive the requested unmasked data from the payment card API 710.

In operation 726, the enclave API 708 can request an EC public certificate with the public key to the EC KeyStore API 704. In operation 728, the enclave API 708 can receive the EC public certificate with the public key from the EC KeyStore API 704.

In operation 730, the enclave API 708 can retrieve the EC public/private key pair based on the EC public certificate with the public key. In operation 732, the enclave API 708 can produce an ephemeral encryption key with a mobile public key. In operation 734, the enclave API 708 can encrypt the unmasked data.

In operation 736, the enclave API 708 can send the encrypted data to the experience API 706. This message can include the EC cert containing the server public key associated with the enclave server. In operation 738, the experience API 706 can send the encrypted data to the mobile device 702. In operation 740, the mobile device 702 can unencrypt the data using the mobile private key and the server public key and the ephemeral encryption key.

While an example of encrypting card data may be described in the present embodiments, the present embodiments are not limited to such an illustrative example. For example, the data being encrypted can include personally identifiable information (PII), PCI, shipment data, medical data, etc. Further, the encryption of data may not be limited by network polices, such as policies with transport layer security (TLS) protocols.

In some embodiments, by implementing a field-by-field encryption process as described herein, implementing ephemeral keys may indicate that the data is protected on each hop across a network and that each session creates keys that can be independent to keys generated in other sessions. Accordingly, a request by a first client can include keys unique to keys generated by a second client, for example. Further, the encrypted data may mitigate unauthorized decrypting between the mobile device and encryption service, as the intermediary device may have insufficient data to decrypt the data. In the event that an intermediary device gains access to keys of a first client, the intermediary device would be unable to decrypt data of a second client due to unique keys being generated for the second client.

Figure 8:
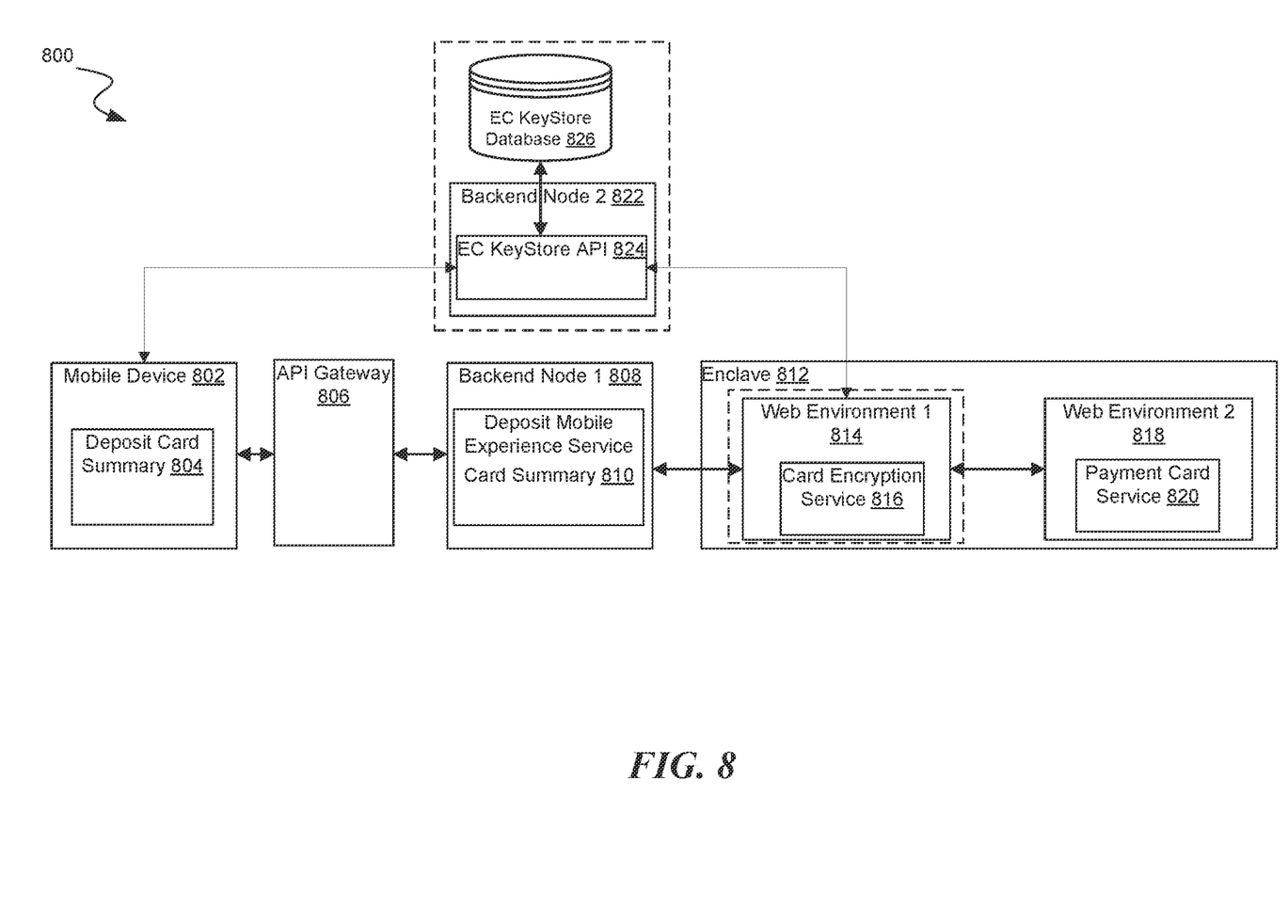
FIG. 8 is a block diagram of an example system architecture, in accordance with a third example embodiment.

FIG. 8 is a block diagram of an example system architecture 800, in accordance with a third example embodiment. As shown in FIG. 8, the architecture 800 can include a mobile device 802. The mobile device 802 can include a deposit card summary 804.

The mobile device 802 can send a request for data (e.g., a card number) to an API gateway 806. The request can be forwarded from API gateway 806 to backend node 1 808. The backend node 1 808 can include a deposit mobile experience service card summary 810. The backend node 1 can request the card number from a web environment 814 in the enclave 812. Web environment 1 814 can include a card encryption service 816 that can request the card number from the payment card service 820 in web environment 2 818.

The mobile device 802 and web environment 1 814 can access a second backend node 822 that includes an EC KeyStore API 824. The second backend node 822 can provide secure encryption information to each node via the EC KeyStore API 824. The second backend node 822 can include an EC KeyStore database 826 to store/maintain various encryption information and KeyStore information.

Example Device Implementation Overview

Figure 9:
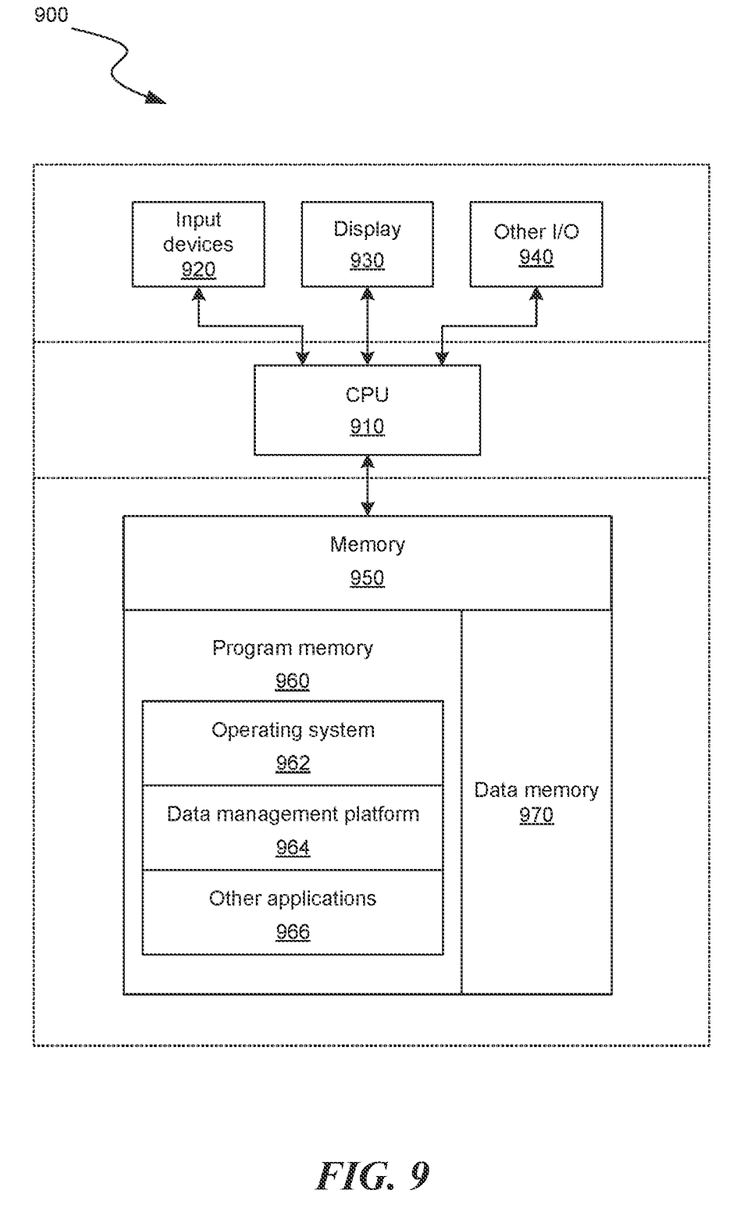
FIG. 9 is a block diagram illustrating an overview of devices on which some implementations of the present embodiments can operate.

FIG. 9 is a block diagram illustrating an overview of devices on which some implementations of the present embodiments can operate. The devices can comprise hardware components of a device 900, such as a mobile device, enclave API, encryption service, and/or backend node as described herein.

Device 900 can include one or more input devices 920 that provide input to the CPU (processor) 910, notifying it of actions. The actions are typically mediated by a hardware controller that interprets the signals received from the input device and communicates the information to the CPU 910 using a communication protocol. Input devices 920 include, for example, a mouse, a keyboard, a touchscreen, an infrared sensor, a touchpad, a wearable input device, a camera- or image-based input device, a microphone, or other user input devices.

CPU 910 can be a single processing unit or multiple processing units in a device or distributed across multiple devices. CPU 910 can be coupled to other hardware devices, for example, with the use of a bus, such as a PCI bus or SCSI bus. The CPU 910 can communicate with a hardware controller for devices, such as for a display 930. Display 930 can be used to display text and graphics. In some examples, display 930 provides graphical and textual visual feedback to a person operating the device 900. In some implementations, display 930 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 940 can also be coupled to the processor, such as a network card, video card, audio card, USB, Fire Wire or other external device, camera, printer, speakers, CD-ROM drive, DVD drive, disk drive, or Blu-Ray device.

In some implementations, the device 900 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 900 can utilize the communication device to distribute operations across multiple network devices.

The CPU 910 can have access to a memory 950. A memory can include one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 950 can include program memory 960 that stores programs and software. Memory 950 can also include data memory 970 that can include various information as described in this patent document, which can be provided to the program memory 960 or any element of the device 900. The program memory 960 can include a data management platform 964 and other applications 966 capable of performing the processing tasks as described herein.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in the present Figures and/or in the various embodiments described in this patent document.

Those skilled in the art will appreciate that the components illustrated in FIGS. 1-9 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method of establishing secure communication via a key agreement procedure, the method comprising:
creating, by a first device, a first device-specific certificate with a first device-specific public key that is derived based on an Elliptic Curve (EC) key pair and information that is selected by and specific to the first device, wherein the first device-specific certificate includes an identifier used to authenticate the first device, wherein the first device-specific public key includes device data linked to hardware of the first device and unique to the first device and only known by the first device to enable decryption by the first device;
sending, to an encryption node, a request for an identified set of data, the request including the first device-specific certificate;
receiving, at the first device, a response message that includes the identified set of data that is encrypted and a second certificate associated with the encryption node that includes an encryption node public key derived from the EC key pair and the information specific to the encryption node;
generating, at the first device, a second device-specific encryption key using the second certificate and the EC key pair; and
unencrypting, at the first device, the identified set of data using a first device private key, the encryption node public key, and the second device-specific encryption key.

2. The method of claim 1, further comprising:
sending, to the encryption node, the request via one or more intermediary nodes, wherein the one or more intermediary nodes are unable to decrypt information obtained from the first device or the encryption node.

3. The method of claim 1, further comprising:
generating, at the first device, the second device-specific encryption key by combining of EC key pair data and first device specific information.

4. The method of claim 1, wherein the request includes a first field that does not include sensitive information and a second field that includes sensitive information, wherein at least a portion of the identified set of data is included in the second field.

5. The method of claim 1, wherein the request identifies a portion of data to be encrypted by the encryption node.

6. The method of claim 1, wherein the first device-specific public key includes a combination of the information selected by the first device from the EC key pair and a set of information specific to the first device.

7. The method of claim 1, wherein the first device is configured to generate the EC key pair.

8. A system comprising:
one or more processors; and
one or more memories storing instructions that, when executed by the one or more processors, cause the system to perform a process of establishing secure communication comprising:
creating, by a first device, a first device-specific certificate with a first device-specific public key that is derived based on an Elliptic Curve (EC) key pair and information that is selected by and specific to the first device, wherein the first device-specific certificate includes an identifier used to authenticate the first device, wherein the first device-specific public key includes device data linked to hardware of the first device and unique to the first device and only known by the first device to enable decryption by the first device;

sending, to an encryption node, a request for an identified set of data, the request including the first device-specific certificate;

receiving, at the first device, a response message that includes the identified set of data that is encrypted and a second certificate associated with the encryption node that includes an encryption node public key derived from the EC key pair and the information specific to the encryption node;

generating, at the first device, a second device-specific encryption key using the second certificate and the EC key pair; and unencrypting, at the first device, the identified set of data using a first device private key, the encryption node public key, and the second device-specific encryption key.

9. The system according to claim 8, wherein the process further comprises:

sending, to the encryption node, the request via one or more intermediary nodes, wherein the one or more intermediary nodes are unable to decrypt information obtained from the first device or the encryption node.

10. The system according to claim 8, wherein the process further comprises:

generating, at the first device, the second device-specific encryption key by combining of EC key pair data and first device specific information.

11. The system according to claim 8, wherein the request includes a first field that does not include sensitive information and a second field that includes sensitive information, wherein at least a portion of the identified set of data is included in the second field.

12. The system according to claim 8, wherein the request identifies a portion of data to be encrypted by the encryption node.

13. The system according to claim 8, wherein the first device-specific public key includes a combination of the information selected by the first device from the EC key pair and a set of information specific to the first device.

14. The system according to claim 8, wherein the first device is configured to generate the EC key pair.

15. A non-transitory computer-readable medium storing instructions that, when executed by a computing system, cause the computing system to perform operations of establishing secure communication, the operations comprising:

creating, by a first device, a first device-specific certificate with a first device-specific public key that is derived based on an Elliptic Curve (EC) key pair and information that is selected by and specific to the first device, wherein the first device-specific certificate includes an identifier used to authenticate the first device, wherein the first device-specific public key includes device data linked to hardware of the first device and unique to the first device and only known by the first device to enable decryption by the first device;

sending, to an encryption node, a request for an identified set of data, the request including the first device-specific certificate;

receiving, at the first device, a response message that includes the identified set of data that is encrypted and a second certificate associated with the encryption node that includes an encryption node public key derived from the EC key pair and the information specific to the encryption node;

generating, at the first device, a second device-specific encryption key using the second certificate and the EC key pair; and unencrypting, at the first device, the identified set of data using a first device private key, the encryption node public key, and the second device-specific encryption key.

16. The non-transitory computer-readable medium of claim 15, wherein the operations further comprise:

sending, to the encryption node, the request via one or more intermediary nodes, wherein the one or more intermediary nodes are unable to decrypt information obtained from the first device or the encryption node.

17. The non-transitory computer-readable medium of claim 15, wherein the operations further comprise:

generating, at the first device, the second device-specific encryption key by combining of EC key pair data and first device specific information.

18. The non-transitory computer-readable medium of claim 15, wherein the request includes a first field that does not include sensitive information and a second field that includes sensitive information, wherein at least a portion of the identified set of data is included in the second field.

19. The non-transitory computer-readable medium of claim 15, wherein the request identifies a portion of data to be encrypted by the encryption node.

20. The non-transitory computer-readable medium of claim 15, wherein the first device-specific public key includes a combination of the information selected by the first device from the EC key pair and a set of information specific to the first device, and wherein the first device is configured to generate the EC key pair.

\* \* \* \* \*